June 24, 1969
V. BROWN
3,451,799
COMPOSTING METHOD FOR AEROBIC DIGESTION OF
ORGANIC WASTE MATERIAL
Filed June 2, 1967
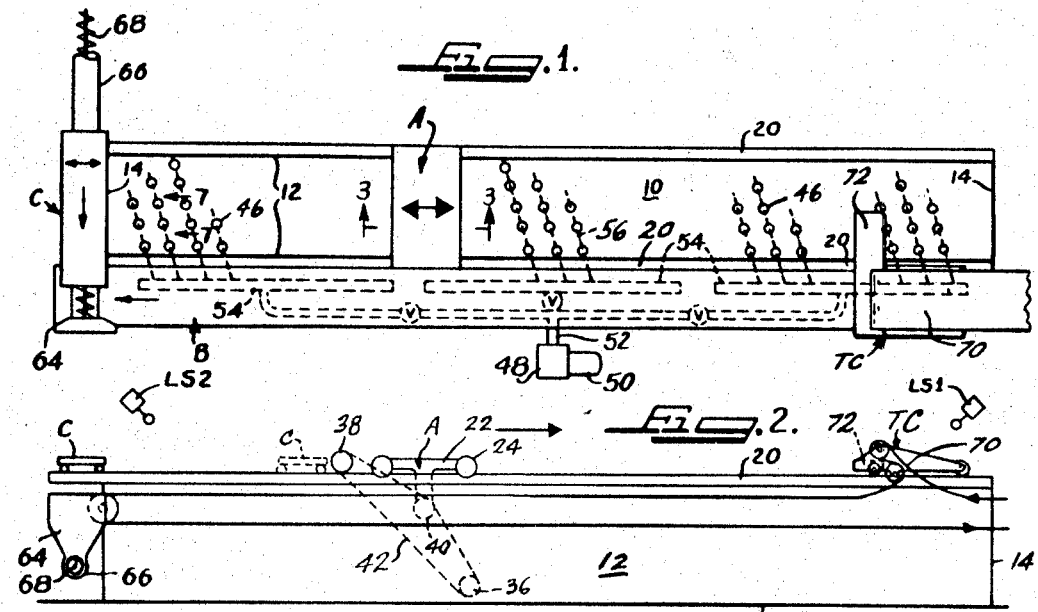
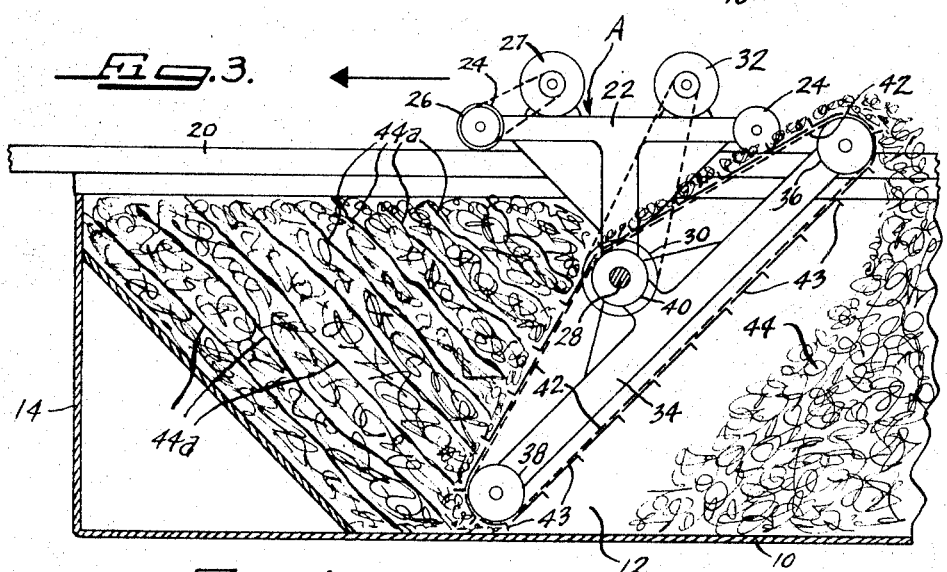
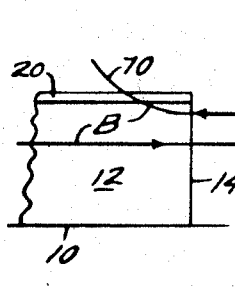
INVENTOR.
VICTOR BROWN
BY Bair, Freeman
& Molinare Attys.

3,451,799
COMPOSTING METHOD FOR AEROBIC DIGESTION OF ORGANIC WASTE MATERIAL
Victor Brown, Elmhurst, Ill., assignor, by mesne assignments, to Metropolitan Waste Conversion Corporation, Wheaton, Ill., a corporation of Delaware
Continuation-in-part of application Ser. No. 497,035, Oct. 18, 1965. This application June 2, 1967, Ser. No. 643,084
The portion of the term of the patent subsequent to June 6, 1984, has been disclaimed and dedicated to the public
Int. Cl. C05f 11/00
U.S. Cl. 71—9      2 Claims

ABSTRACT OF THE DISCLOSURE

A composting method which produces complete aerobic digestion of waste organic material, such as garbage, performed in an apparatus of batch-type which is capable of operation through the entire range of mesophilic and thermophilic digestion as well as cooling-out and partial drying.

---

The present application is a continuation-in-part of my copending application Ser. No. 497,035, filed Oct. 18, 1965, now Patent No. 3,323,896.

One object of the present invention is to provide a method for composting waste organic material and obtaining therefrom an organic fertilizer of guaranteed uniform analysis which comprises first distributing a mass of heterogeneous ground waste material in layers in a tank, lifting the material from the ends of the layers to a point above the surface of the mass and dropping it back into the tank to convert the heterogeneous layered mass to a homogeneous non-layered mass while exposing it to air, chemically analyzing the batch and adding chemicals as required, either in solution by spraying or fogging, or by broadcasting if dry chemicals are used, to produce a fertilizer product of desirable and uniform analysis.

Still another object is to add chemicals as required to secure a desired chemical content after analyzing the batch and using the apparatus to accomplish even distribution of the chemicals throughout the batch.

A further object is to provide a method which utilizes the movement of an agitator back and forth along a tank containing a heterogeneous layered mass of waste material, to convert the mass to fertilizer of guaranteed analysis, the apparatus first utilizing a feeder for filling the tank and which produces uniform layers of differing composition throughout the tank, then tumbling and mixing by moving the agitator a number of passes throughout the length of the tank, then distributing additional chemical to the mass and again utilizing the agitator to tumble the mass and chemicals to evenly distribute the one relative to the other.

With these and other objects in view, my invention consists in the steps of my herein disclosed composting method, whereby the objects above contemplated are attained, as hereinafter more fully set forth, pointed out in my claims and illustrated in detail on the accompanying drawing, wherein:

FIG. 1 is a diagrammatic plan view of a composting apparatus suitable for practicing my composting method;

FIG. 2 is a diagrammatic side elevation thereof;

FIG. 3 is a vertical detailed sectional view taken on the line 3—3 of FIG. 1;

FIG. 4 is a continuation of the right-hand end of FIG. 3; and

FIG. 5 is a diagrammatic lateral cross section through the apparatus.

On the accompanying drawing I have used the reference numeral 10 to indicate the bottom of an elongated tank, 12 the sides thereof and 14 the ends thereof. The tank 10, 12, 14 may be formed of sheet metal, concrete or other suitable material in a size such as 12' wide and 250' long. The size, of course, may be varied to suit the requirements of my method. Specific details of the tank are shown in my Patent No. 3,294,491.

Along the sides 12 of the tank I provide a pair of rails 20. An agitator A and a conveyor C are adapted to travel along the rails 20. The agitator A comprises a suitable frame 22 which is supported by wheels 24 on the rails 20. In FIG. 3 a sprocket 26 is shown which may be driven from a motor 27 for propelling the agitator A along the rails 20.

A shaft 28 is journalled in the frame 22 and is provided with a sprocket 30 driven by a motor 32. A conveyor carrying frame 34 is pivoted on the shaft 28 for tilting clockwise as in FIG. 2, or counter-clockwise as in FIG. 3, and carries pairs of elevator sprockets 36 and 38 at its ends. A third pair of elevator sprockets 40 is secured to the shaft 28 and a pair of endless elevator chains 42 extend around the pairs of sprockets 36, 38 and 40, and carry elevator buckets 43 which have ends that terminate relatively close to the walls 12 so that the buckets substantially span the tank laterally for elevating the organic material 44 therein as will hereinafter appear. Such material has been previously reduced to small particle size as by a grinder or hammer mill 74 shown in FIG. 4 and water mixed with it to the proportion of 60% or so to form a slurry-like mass.

The entire agitator A as well as its buckets 43 are symmetrical for operation in either direction. The elevator chains 42 and their buckets 43 operate at an angle inclined from the vertical in a gap of the material 44 as illustrated in FIG. 3.

Both motors 27 and 32 are provided with suitable step-down gearing as the speed of rotation for the sprockets 26 and 30 is necessarily much slower than the rotation of the motor shaft. The step-down gearing also preferably includes a suitable means for changing the speed of rotation of the output shaft to meet varying requirements.

The agitator A is adapted to travel toward the left as shown in FIG. 3 at which time the elevator sprockets 40 travel clockwise thus elevating the buckets 43 on the left or front side and lowering them on the right or back side. As the buckets speed up slightly in traveling over the top of the sprockets 38 they throw their contents back into the tank behind the agitator A as illustrated. Reversely, when the agitator travels toward the right, as in FIG. 2, the sprockets 40 will rotate counter-clockwise and pick up material on the right side which is now the front side and discharge it from the left side behind the agitator.

The agitator A is operated to traverse the tank in one direction, and when it arrives at one end of the tank, it and the rotation of the sprocket 30 are reversed so as to travel in the opposite direction. It is again reversed at the end of such travel, thereby traveling back and forth throughout the length of the tank in a continuous manner. The organic material 44 is thus progressively agitated and elevated for evenly distributing the bacteria and periodically aerating each portion of the material during the digesting process.

In this connection it may be mentioned that there are two phases of digestion, a first phase of mesophilic digestion in the range of about 110 degrees F. for a twenty-four-hour period, then thermophilic digestion at about 140 degrees F. for a further twenty-four-hour period followed by a sterilization period of approximately 165 degrees F. for a forty-eight-hour period. After that, cooling out and partial drying may be accomplished in the apparatus disclosed or the hot material may be removed for cooling out and drying elsewhere if desired.

In a tank and agitator apparatus of the kind described, the digesting process is helped by the introduction of air at the bottom of the tank, the temperature of which may be controlled as desired. Also the addition of water particularly at the gap in the material produced by the agitator as shown in the parent application and in my Patent No. 3,294,491 hereinbefore mentioned is advantageous.

For the purpose of introducing air, a plurality of pots 46 as shown in FIG. 1 in the bottom 10 of the tank and a blower 48 for supplying air thereto are shown. The blower 48 is driven by a motor 50 and has an airline 52 extending to manifolds 54 from which branch pipes 56 extend to a nozzle 58 in each pot 46. The nozzles may be merely pipe caps, each drilled with a small opening one-eighth inch or so in diameter and the pots may be filled with gravel to diffuse the air discharged from the nozzles as shown in detail in the just mentioned patent.

After the digesting period, and the cooling out and drying period if practiced in the tank, the digested material 44 may be removed therefrom by positioning the conveyor C as shown in dotted lines in FIG. 2 and attaching it to the frame 22 for travel therewith so that as the agitator traverses the tank from left to right the conveyor C will receive he material and discharge it on a conveyor B shown in FIG. 1 adjacent the near side 12 of the tank. The conveyor B may discharge into a hopper 64 of a take-away conveyor 66 which may be of the screw type, the screw being shown at 68.

In the operation of an apparatus of the kind disclosed, the various phases of aerobic digestion, etc., may be automatically programmed or manually controlled as desired. In either event it is desirable to have limit switches such as LS1 and LS2 in FIG. 2 to automatically reverse the travel of the agitator A and the bucket elevator carried thereby for back-and-forth operation of the agitator in a continuous manner.

During the mesophilic phase of digestion, the temperature of the air discharged from the pots 46 may be regulated (thermostatically if desired) to maintain th 110 degree F. temperature within the mass of organic material 44. Likewise the thermophilic and sterilizing phases may be regulated as to the respective temperatures of 140 degrees F. and 165 degrees F. Then if a cooling out and partial drying period is desired, the temperature of the air can be reduced as desired and thus the single tank and apparatus disclosed serve to completely process the organic material from undigested material with a proportion of bacteria mixed with it for initiating the digesting operation to completely digest it, and then sterilize the material to make it suitable as a soil conditioner after it has been further dried.

The foregoing described apparatus efficiently agitates a batch of organic material throughout the various phases of digestion, sterilization and cooling out. The agitator is so designed that in cooperation with the conveyor C the material may be removed from the tank after the processing has been completed. The next batch of material may be brought in from the grinder 74 on the conveyor belt B from which it may be removed by a suitable tripper conveyor TC having an elevating section 70 for a portion of the conveyor belt B and a conveyor section 72 to receive the material from the conveyor belt and deposit it at substantially the center from side to side of the tank 10, 12, 14. The tripper conveyor is wheel-mounted for travel along the belt B so it also can travel back and forth throughout the length of the tank. As it slowly travels in one direction (as toward the right in FIG. 3) it deposits successive batches of the organic material 44 in progressive multiple layers as shown at 44a, in FIGS. 3 and 5 spaced along the length of the tank and inclined at substantially the angle of repose of the material. Defining such angle, various batches of materials such as grass, paper, restraurant garbage, etc. will, as they fall from the discharge end of the tripper conveyor TC tumble along the inclined wall at the left end of the tank 10, 12, 14 (FIG. 3), and form roughly a layer up to the first (left hand) line 44a; then a second layer up to the second line 44a and so on. When the tumbling action for one batch of material ceases, the top surface of that batch is at its "angle of repose," and the several lines 44a in FIG. 3 indicate such angles. These angles of repose are acute with respect to the bottom of the tank. After deposit, the agitator A can be energized for operation on the new batches of material by elevating the material up and over the top of the agitator and dropping it back into the tank as the agitator traverses the length of the tank. It will be noted that the angle of those portions of the elevator chains 42 which are picking up the material cut laterally across the layers 44a (at substantially right angles to them), the purpose of which will hereinafter appear.

Most of the foregoing described apparatus is claimed in my Patent No. 3,294,491 above mentioned and in another copending application Ser. No. 524,344, filed Feb. 1, 1966. It may be used for practicing my herein claimed method to produce such uniformity of the heterogeneous layered mass of organic material 44a that a fertilizer of guaranteed analysis can be taken from the tank. This is accomplished by:

(1) Sorting the heterogeneous garbage received at the composting plant so as to remove non-organic materials.

(2) Grinding the heterogeneous remaining organic materials (grinder 74 in FIG. 4) to reduce large particles to a suitable size (for example 2" particles) for aerobic digestion.

(3) Filling the tank in such manner as to give a uniform distribution of the successive batches of differing composition, e.g., grass, paper, restaurant garbage, etc., by reason of filling the tank by progressive travel of the tripper conveyor TC while the conveyor belt B is being operated to bring to the tripper the organic material after it has been ground, which operation may take as much as a day or two to accomplish in a tank of the size referred to.

(4) Tumbling and mixing accomplished by the back-and-forth movements of the agitator A a number of times such as five to ten times per tankful of batches during each of the aerobic stages and the cooling out and partial drying stage above referred to. Since the elevator action of the agitator A is one of cutting laterally across the layers 44a, it picks up material from many layers, each of somewhat different composition, and thus contributes to the final production of a uniform, non-layered mass.

(4A) Chemically analyzing the batch as by analyzing random samples at periodic stations along the tank. From such analyzation the analyst can determine the necessary quantities of chemical such as nitrogen, phosphate, potash, etc., that need to be added to the mass to bring it up to the desired chemical content suitable as a fertilizer for any desired type of ground.

(4B) Adding chemicals, broadcast by hand or otherwise if it is a powdered or granular type of chemical, or spraying it into the tank if it is liquid in order to bring the organic material up to the required analysis for uniform product throughout the batch. The additional powdered or granular chemical may be added by supplying it on the belt B to the tripper conveyor TC if desired, or if in liquid form can be sprayed or fogged from the water pipe 62 or supplied to the nozzles 58 by introducing it into the line 52 and through the manifolds 54 in an obvious manner. Deposit of the incoming mass of diverse materials in the tank as described and the maximum dispersion produced by using the apparatus as suggested give a uniform end product. At any time aerobic digestion is complete, bacterial action can be stopped by complete aeration to cool and dry the mass. This maximizes the nitrogen content since the bacteria continue to work on the mass of material and give off nitrogen needed to produce high food value in the fertilizer.

(4C) Cooling out and partial drying of the contents of the tank.

(5) Removal of the tank contents by operation of the agitator A, conveyor C, belt B and auger 68. The resulting fertilizer is then dried for a final moisture content of something less than 25%.

Some changes may be practiced in the steps of my composting method without departing from the real spirit and purpose of my invention, and it is my intention to cover by my claims any modification of such steps or use of mechanically equivalent steps which may reasonably be included within their scope.

I claim as my invention:

1. A method for coverting successive batches of organic refuse material of differing composition to a compost of uniform composition which comprises grinding each batch in succesion, depositing the successive batches of ground material throughout the length of a tank in multiple layers inclinded at substantially the angle of repose of the material, which angle is acute with respect to the bottom of the tank, said layers being of differing composition depending upon the composition of refuse material in said batches, uniformly and progressively elevating said material in a direction which is crosswise of said layers to a point above the top layer in said tank and dropping it back into said tank to intermix said layers into a uniform non-layered mass, while exposing all of said material to air.

2. The method of claim 1 in which nitrogen phosphate or potash chemicals are uniformly supplied to the intermixed layers and said elevating step is repeated during the conversion process to distribute uniformly said chemicals throughout the compost product.

References Cited

UNITED STATES PATENTS 3,323,896   6/1967   Brown _____ 71—9

S. LEON BASHORE, *Primary Examiner.*

R. D. BAJEFSKY, *Assistant Examiner.*

U.S. Cl. X.R.

71—14, 23